United States Patent
Stewart

(10) Patent No.: US 10,337,942 B2
(45) Date of Patent: Jul. 2, 2019

(54) PRESSURE SENSOR TEMPERATURE COEFFICIENT OFFSET ADJUSTMENT

(71) Applicant: Honeywell International Inc., Morris Plains, NJ (US)

(72) Inventor: Carl Stewart, Plano, TX (US)

(73) Assignee: Honeywell International Inc., Morris Plains, NJ (US)

( * ) Notice: Subject to any disclaimer, the term of this patent is extended or adjusted under 35 U.S.C. 154(b) by 235 days.

(21) Appl. No.: 15/231,306

(22) Filed: Aug. 8, 2016

(65) Prior Publication Data

US 2018/0038759 A1 Feb. 8, 2018

(51) Int. Cl.
*G01L 27/00* (2006.01)
*G01L 9/06* (2006.01)

(52) U.S. Cl.
CPC ............ *G01L 27/005* (2013.01); *G01L 9/065* (2013.01)

(58) Field of Classification Search
CPC .............................. G01L 27/005; G01L 9/065
USPC .......................................... 73/708, 765, 766
See application file for complete search history.

(56) References Cited

U.S. PATENT DOCUMENTS

| | | | | |
|---|---|---|---|---|
| 4,462,018 A | * | 7/1984 | Yang et al. | G01L 19/148 338/3 |
| 4,672,853 A | * | 6/1987 | Hickox | G01L 9/065 73/708 |
| 5,146,788 A | * | 9/1992 | Raynes | G01L 1/2281 338/4 |
| 5,537,882 A | * | 7/1996 | Ugai et al. | G01L 9/0054 338/42 |
| 5,994,161 A | * | 11/1999 | Bitko | B81B 7/0012 438/50 |
| 7,278,319 B2 | | 10/2007 | Johnson | |
| 8,302,483 B2 | | 11/2012 | Chiou et al. | |
| 2005/0160823 A1 | * | 7/2005 | Zdeblick et al. | A61B 5/0215 73/715 |
| 2009/0096040 A1 | * | 4/2009 | Morales | G01L 19/146 257/415 |

FOREIGN PATENT DOCUMENTS

WO 90/06723 A1 6/1990

* cited by examiner

*Primary Examiner* — Andre J Allen
(74) *Attorney, Agent, or Firm* — Seager, Tufte & Wickhem LLP

(57) ABSTRACT

Embodiments relate generally to systems and methods for adjusting a temperature coefficient of the offset voltage (TCO) for a pressure sensor, the method comprising assembling the pressure sensor, wherein the sensor comprises a plurality of resistive elements; determining the TCO distribution for the sensor; increasing the resistance of one of a stress induced resistor or a leadout resistor of a first resistor; and decreasing the resistance of one of the stress induced resistor or the leadout resistor of the first resistor to adjust the TCO of the sensor.

18 Claims, 7 Drawing Sheets

PRESSURE SENSOR TEMPERATURE COEFFICIENT OFFSET ADJUSTMENT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A pressure sensor may be used to detect the pressure of fluids in a variety of sensing applications. Pressure sensors are often used to sense an external force applied to the sensors and provide an output signal representative of the applied force. Such sensors can be used in a wide variety of applications, including medical applications. Pressure sensors are also commonly used in non-medical applications, such as industrial and commercial applications as well as other applications.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for controlling a temperature coefficient of the offset voltage (TCO) within a pressure sensor by adjusting the resistance within the electrical circuit of the sensor. Silicon-based pressure sensors typically comprise an arrangement of stress induced resistors in a Wheatstone bridge electrical circuit. When the stress induced resistors are arranged this way, unless each resistor is perfectly matched in value and temperature coefficient of resistance (TCR), a TCO will result. Additionally, the TCO may also be influenced by the assembly process. The result is a typical TCO distribution that is not centered at zero.

Figure 1:
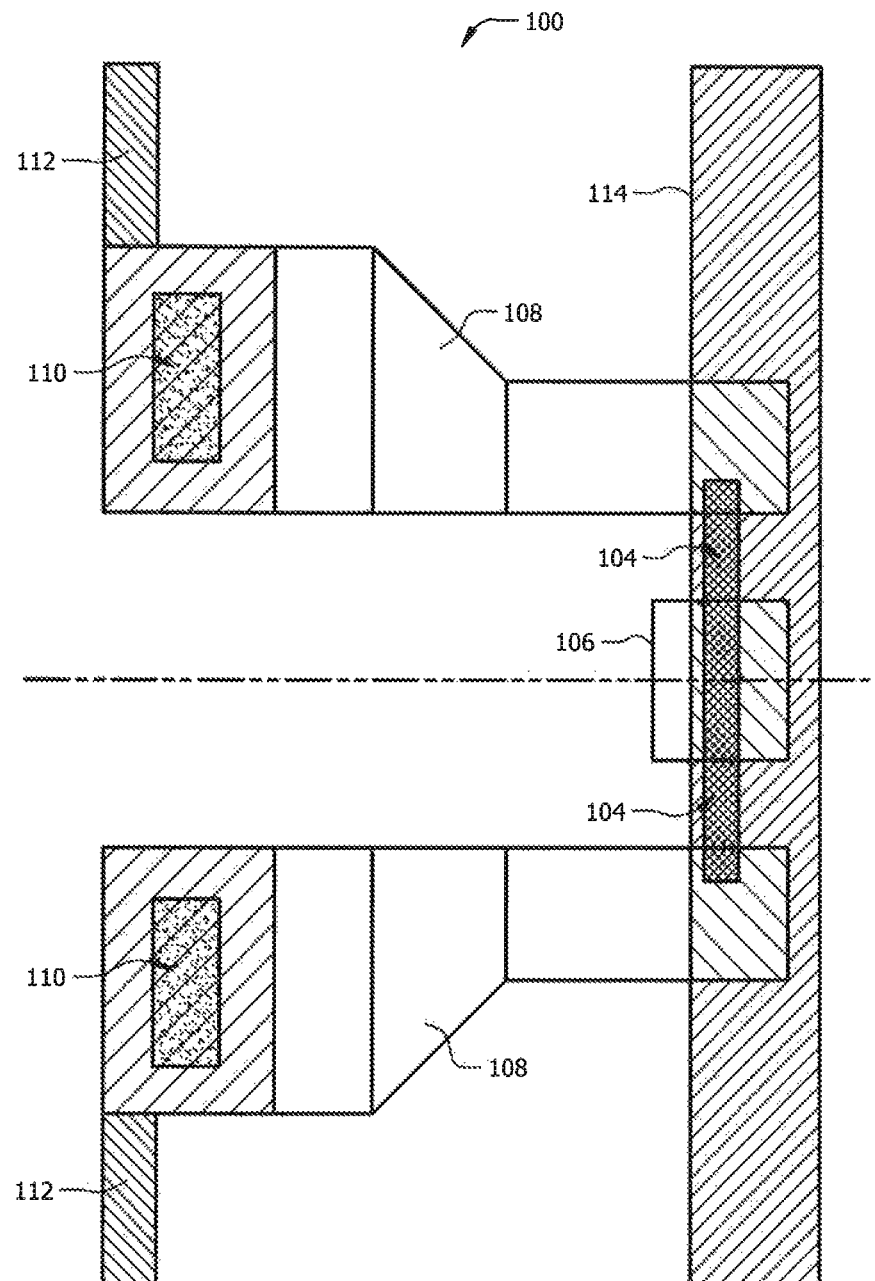
FIG. 1 illustrates a resistor which may be used in a pressure sensor according to an embodiment of the disclosure.

Referring now to FIG. 1, a detailed view of Wheatstone bridge resistor 100 is shown. Wheatstone bridge resistors may typically be made from two differently doped p-type areas. For example, a stress induced resistor 104 (such as a piezoresistor) may be lightly doped to maximize the pi coefficient for maximum sensitivity. Additionally, a leadout resistor 108 and 106 may be much more highly doped to minimize sensitivity to pressure and make electrical connection to the stress induced resistor 104 on the diaphragm 114 without a defined contact overlapping the stress induced resistor 104 area. The leadout resistor 108 and 106 may be used to route the electrical signal off of the diaphragm 114 to a metal contact 110, wherein the metal contact 110 may connect to a metal interconnection 112 operable to provide electrical connection between the resistor 100 and other resistors in the sensor. The leadout resistor 108 and 106 may comprise a first portion 108 located between the stress induced resistor 104 and the metal contact 110 and a second portion 106 located between two sections of the stress induced resistor 104. The two portions of the leadout resistor may be adjusted separately to change the resistance of the leadout resistor 108 and 106 and/or the stress induced resistor 104. The stress induced resistor 104 and the leadout resistor 108 and 106 may have a different TCR, and adjusting the resistance of these resistors 104 and 108 may be used to shift the TCO distribution of the resistor 100.

In some embodiments, the resistance of leadout resistor 108 may be changed by increasing or decreasing the cross-sectional area of the first portion 108 of the leadout resistor and/or the second portion 106 of the leadout resistor. In some embodiments, the stress induced resistor 104 may be adjusted by changing the dimension of the second portion 106 of the leadout resistor. For example, the size of the second portion 106 of the leadout resistor be decreased or increased to expose more or less of the stress induced resistor 104.

Figure 2:
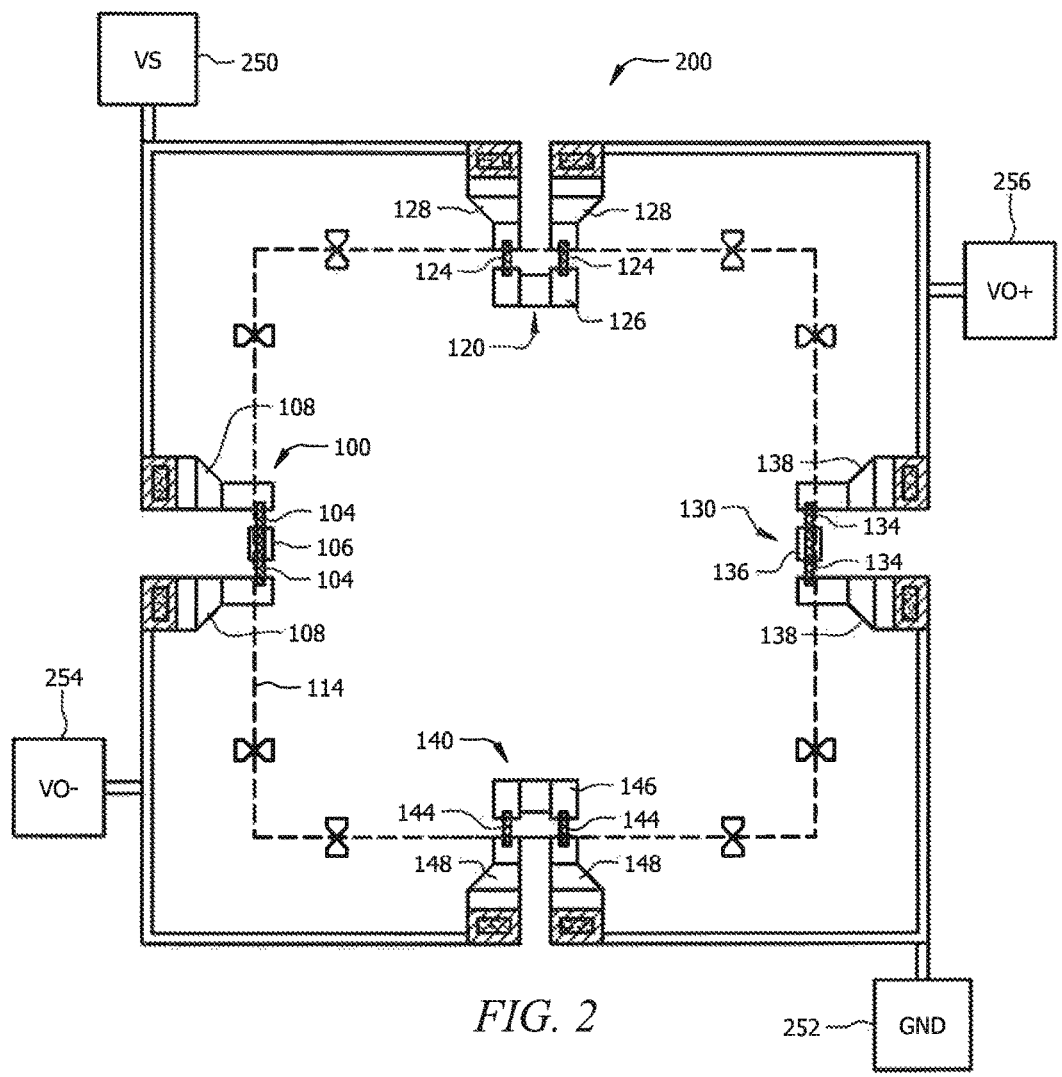
FIG. 2 illustrates a Wheatstone bridge which may be used in a pressure sensor according to an embodiment of the disclosure.

FIG. 2 illustrates a view of a whole Wheatstone bridge 200. The Wheatstone bridge 200 may comprise a voltage source 250, as well as a reference 252 (such as a ground reference). Additionally, the Wheatstone bridge 200 may comprise a negative voltage output 254 and a positive voltage output 256. The Wheatstone bridge resistors 100, 120, 130, and 140 may be matched as closely as possible in layout, however variation may still exist, thereby creating a TCO. The assembly process of the bridge 200 may also have an influence on the TCO of the sensor. Once the bridge 200 (and/or sensor) has been assembled, a statistical distribution of TCO for the bridge 200 may be determined. The mean value of the TCO may be shifted using the TCR difference between the stress induced resistor 104 and the leadout resistor 108 of one or more of the resistors 100, 120, 130, 140. In some embodiments, the TCO may be shifted to be within a range of 0±4 microvolts per volt per degree Celsius (μV/V/° C.). A first resistor 100 may comprise a stress induced resistor 104 and a leadout resistor 108 and 106. A second resistor 120 may comprise a stress induced resistor 124 and a leadout resistor 128 and 126. A third resistor 130 may comprise a stress induced resistor 134 and a leadout resistor 138 and 136. A fourth resistor 140 may comprise a stress induced resistor 144 and a leadout resistor 148 and 146.

In some embodiments, the Wheatstone bridge 200 may be formed with two radial stress induced resistors 104 and 134 and two tangential stress induced resistors 124 and 144 with respect to the edge of the diaphragm 114. The radial and tangential resistors may change in opposite directions when pressure is applied to the diaphragm 114, and the resistors may be typically arranged as shown in FIG. 2. The total TCR of a resistor 100 formed by the stress induced resistor 104 and the leadout resistor 108 can be changed by changing the resistance of each component, and this may be true for each of the resistors 100, 120, 130, and 140.

As an example, the resistance value of the tangential leadout resistors 108 and 138 may be decreased while the resistance value of the tangential stress induced resistors 104 and 134 may be increased by the same value. This will shift the mean TCO value while keeping the offset voltage the same. As another example, the mean TCO can be shifted in the opposite direction by increasing the resistance value of the tangential leadout resistors 108 and 138 and lowering the resistance value of the tangential stress induced resistors 104 and 134 by the same amount.

Additionally, the radial resistors 120 and 140 may be changed. As an example, the resistance value of the radial leadout resistors 128 and 148 may be decreased while the resistance value of the radial stress induced resistors 124 and 144 may be increased by the same value. This will shift the mean TCO value while keeping the offset voltage the same. As another example, the mean TCO can be shifted in the opposite direction by increasing the resistance value of the radial leadout resistors 128 and 148 and lowering the resistance value of the radial stress induced resistors 124 and 144 by the same amount.

Figure 3:
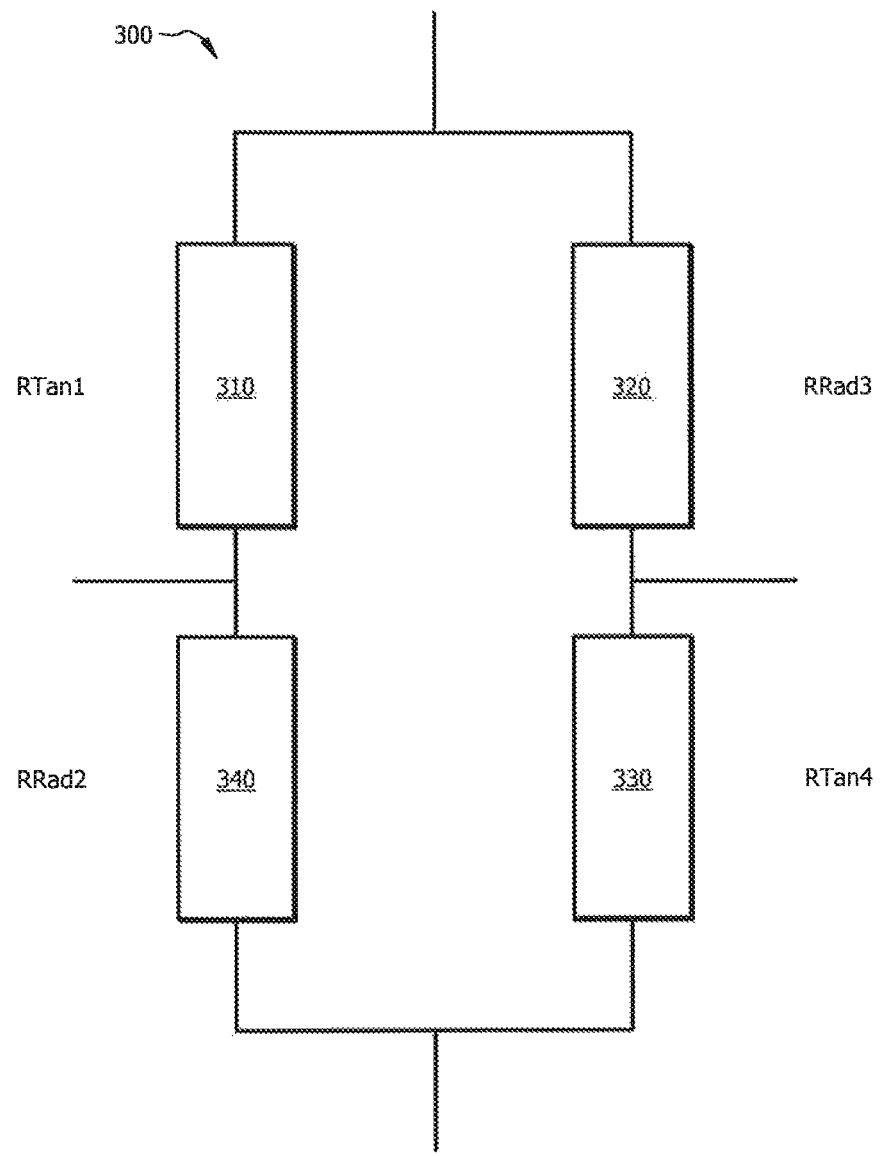
FIG. 3 illustrates a layout of resistors which may be used in a pressure sensor according to an embodiment of the disclosure.

FIG. 3 shows another view of a layout for the resistors. The sensor 300 may comprise a first tangential resistor 310, a first radial resistor 320, a second tangential resistor 330, and a second radial resistor 340.

Figure 4:
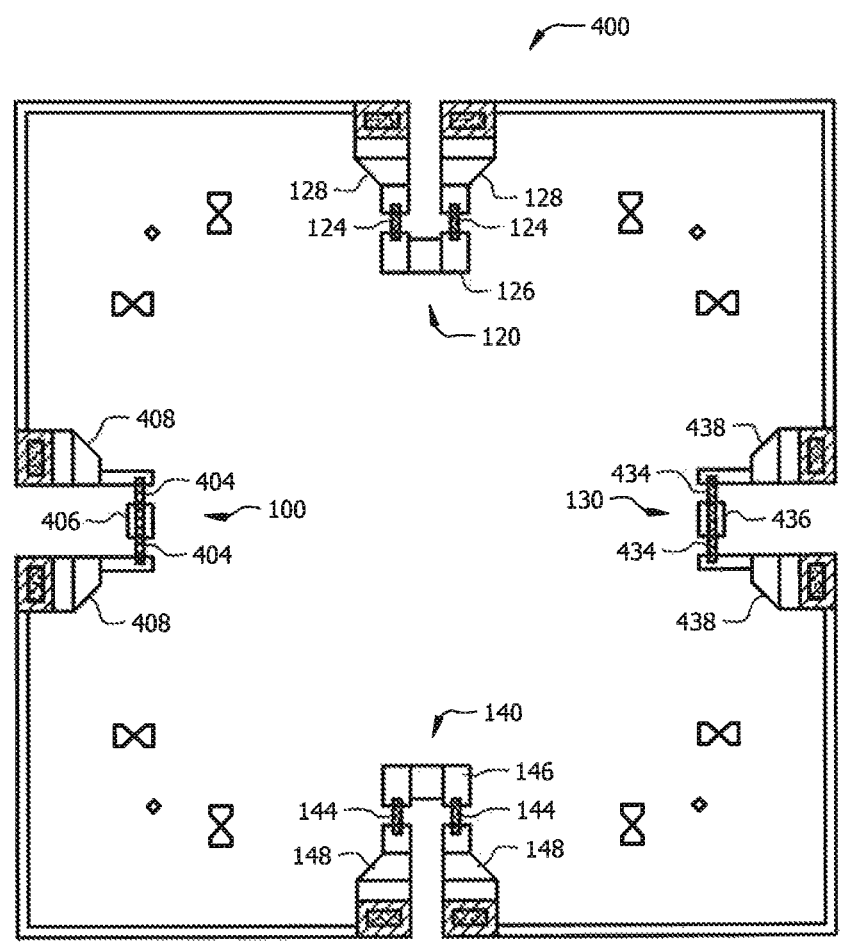
FIG. 4 illustrates another Wheatstone bridge which may be used in a pressure sensor according to an embodiment of the disclosure.

Referring now to FIG. 4, a Wheatstone bridge 400 is shown, wherein the leadout resistor 408 and/or 406 of the tangential resistor 100 has a different resistance than the leadout resistor 128 and/or 126 of the radial resistor 120. Similarly, the leadout resistor 438 and/or 436 of the tangential resistor 130 has a different resistance than the leadout resistor 148 and/or 146 of the radial resistor 140. In the embodiment shown in FIG. 4, the leadout resistor(s) 408 and/or 438 may have an increased resistance, compared to the leadout resistor(s) 128 and/or 148. In some embodiments, the resistance of the leadout resistors 408 and/or 438 may be increased with respect to a predetermined or manufactured resistance.

Additionally, the stress induced resistor 404 of the tangential resistor 100 has a different resistance than the stress induced resistor 124 of the radial resistor 120. Similarly, the stress induced resistor 434 of the tangential resistor 130 has a different resistance than the stress induced resistor 144 of the radial resistor 140. In the embodiment shown in FIG. 4, the stress induced resistor(s) 404 and/or 434 may have a decreased resistance compared to the stress induced resistor(s) 124 and/or 144. In some embodiments, the resistance of the stress induced resistors 404 and/or 434 may be decreased with respect to a predetermined or manufactured resistance. In some embodiments, the stress induced resistors 404 and/or 434 may be adjusted by changing the second portion 406 and/or 436 of the leadout resistors.

Figure 5:
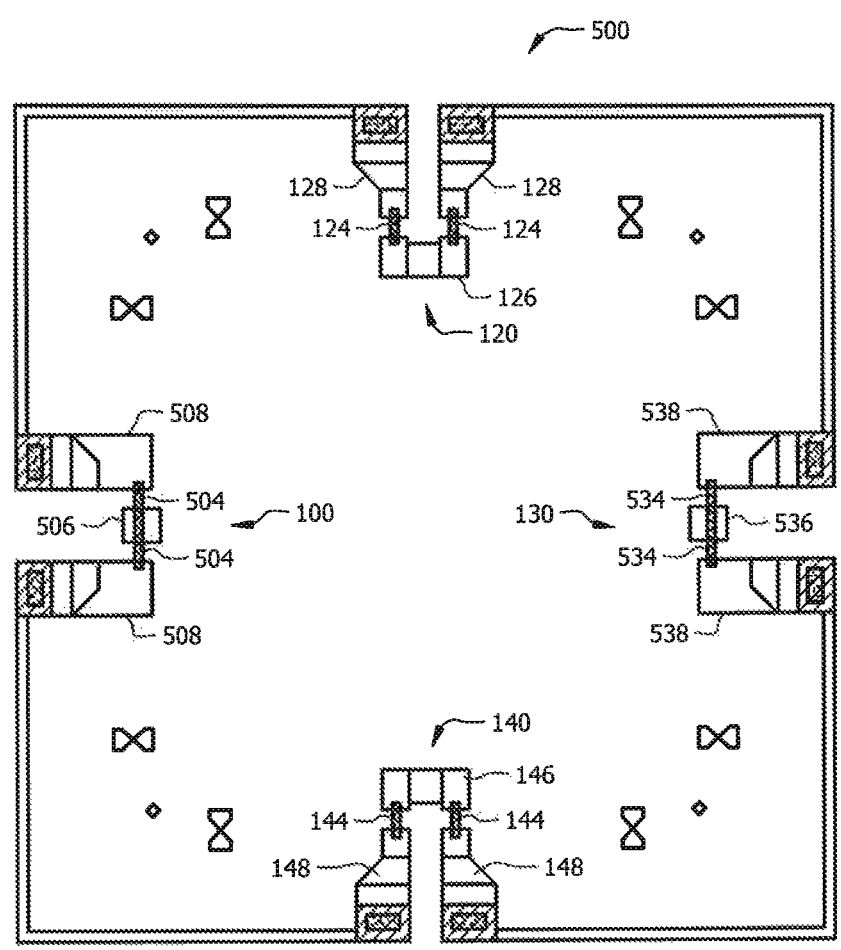
FIG. 5 illustrates yet another Wheatstone bridge which may be used in a pressure sensor according to an embodiment of the disclosure.

Referring now to FIG. 5, a Wheatstone bridge 500 is shown, wherein the leadout resistor 508 and/or 506 of the tangential resistor 100 has a different resistance than the leadout resistor 128 and/or 126 of the radial resistor 120. Similarly, the leadout resistor 538 and/or 536 of the tangential resistor 130 has a different resistance than the leadout resistor 148 and/or 146 of the radial resistor 140. In the embodiment shown in FIG. 5, the leadout resistor(s) 508 and/or 538 may have a decreased resistance compared to the leadout resistor(s) 128 and/or 148. In some embodiments, the resistance of the leadout resistors 508 and/or 538 may be decreased with respect to a predetermined or manufactured resistance.

Additionally, the stress induced resistor 504 of the tangential resistor 100 has a different resistance than the stress induced resistor 124 of the radial resistor 120. Similarly, the stress induced resistor 534 of the tangential resistor 130 has a different resistance than the stress induced resistor 144 of the radial resistor 140. In the embodiment shown in FIG. 5, the stress induced resistor(s) 504 and/or 534 may have an increased resistance, compared to the stress induced resistor(s) 124 and/or 144. In some embodiments, the resistance of the stress induced resistors 504 and/or 534 may be increased with respect to a predetermined or manufactured resistance. In some embodiments, the stress induced resistors 504 and/or 534 may be adjusted by changing the second portion 506 and/or 536 of the leadout resistors.

FIGS. 4 and 5 illustrate examples where the resistance of the tangential resistors has been altered, but the resistance of the leadout resistors and stress induced resistors of the radial resistors 120 and 140 may be similar altered to affect the TCO of the bridge.

In a first embodiment, a method for adjusting a TCO for a pressure sensor may comprise assembling the pressure sensor, wherein the sensor comprises a plurality of resistive elements; determining the TCO distribution for the sensor;

increasing the resistance of one of a stress induced resistor or a leadout resistor of a first resistor; and decreasing the resistance of one of the stress induced resistor or the leadout resistor of the first resistor to adjust the TCO of the sensor.

A second embodiment can include the method of the first embodiment, wherein the value of the increase in resistance is equal to the value of the decrease in resistance.

A third embodiment can include the method of the first or second embodiments, wherein the stress induced resistor of the first resistor is assembled tangential to a diaphragm of the sensor.

A fourth embodiment can include the method of any of the first to third embodiments, wherein the stress induced resistor of the first resistor is assembled radial to the diaphragm of the sensor.

A fifth embodiment can include the method of any of the first to fourth embodiments, further comprising increasing the resistance of one of a stress induced resistor and a leadout resistor of a second resistor; and decreasing the resistance of one of the stress induced resistor and the leadout resistor of the second resistor.

A sixth embodiment can include the method of the fifth embodiment, wherein the stress induced resistor of the first resistor is assembled tangential to the diaphragm of the sensor, and wherein the stress induced resistor of the second resistor is assembled radial to the diaphragm of the sensor.

A seventh embodiment can include the method of any of the fifth to sixth embodiments, wherein the stress induced resistor of the first resistor is assembled radial to the diaphragm of the sensor, and wherein the stress induced resistor of the second resistor is assembled tangential to the diaphragm of the sensor.

An eighth embodiment can include the method of any of the fifth to seventh embodiments, wherein the resistors are arranged to form a Wheatstone bridge.

In a ninth embodiment, a pressure sensor comprises a plurality of resistive elements; at least one radial resistor comprising a first leadout resistor that changes with temperature, and a first stress induced resistor that changes with stress; and at least one tangential resistor comprising a second leadout resistor that changes with temperature, and a second stress induced resistor that changes with stress; wherein the first leadout resistor comprises a different resistance than the second leadout resistor, and wherein the sensor is configured to provide a zero TCO.

A tenth embodiment can include the pressure sensor of the ninth embodiment, wherein the first stress induced resistor comprises a different resistance than the second stress induced resistor.

An eleventh embodiment can include the pressure sensor of the ninth or tenth embodiments, wherein the TCO is within a range of 0±4 microvolts per volt per degree Celsius ($\mu V/V/^\circ$ C.).

A twelfth embodiment can include the pressure sensor of the ninth to eleventh embodiments, wherein the resistance of the first leadout resistor is increased and the resistance of the first stress induced resistor is decreased by the same value.

A thirteenth embodiment can include the pressure sensor of any of the ninth to twelfth embodiments, wherein the resistance of the first leadout resistor is decreased and the resistance of the first stress induced resistor is increased by the same value.

A fourteenth embodiment can include the pressure sensor of any of the ninth to thirteenth embodiments, wherein the stress induced resistor comprises a piezoresistor.

A fifteenth embodiment can include the pressure sensor of the any of the ninth to fourteenth embodiments, further comprising a second radial resistor, wherein the total resistance of the second radial resistor is equal to the total resistance of the first radial resistor.

A sixteenth embodiment can include the pressure sensor of any of the ninth to fifteenth embodiments, further comprising a second tangential resistor, wherein the total resistance of the second tangential resistor is equal to the total resistance of the first tangential resistor.

A seventeenth embodiment can include the pressure sensor of any of the ninth to sixteenth embodiments, wherein the sensor comprises a Wheatstone bridge arrangement.

In an eighteenth embodiment, a method comprises assembling a first radial resistor of a pressure sensor comprising a first leadout resistor and a first stress induced resistor; and assembling a first tangential resistor of the pressure sensor comprising a second leadout resistor and a second stress induced resistor, wherein the first leadout resistor comprises a different resistance than the second leadout resistor, and wherein the pressure sensor has a TCO within a range of 0±4 microvolts per volt per degree Celsius ($\mu V/V/^\circ$ C.).

A nineteenth embodiment can include the method of the eighteenth embodiment, wherein the first stress induced resistor comprises a different resistance than the second stress induced resistor.

A twentieth embodiment can include the method of the eighteenth or nineteenth embodiments, further comprising determining the TCO of the sensor; and adjusting the resistance of one or more of the resistors.

Figure 6:
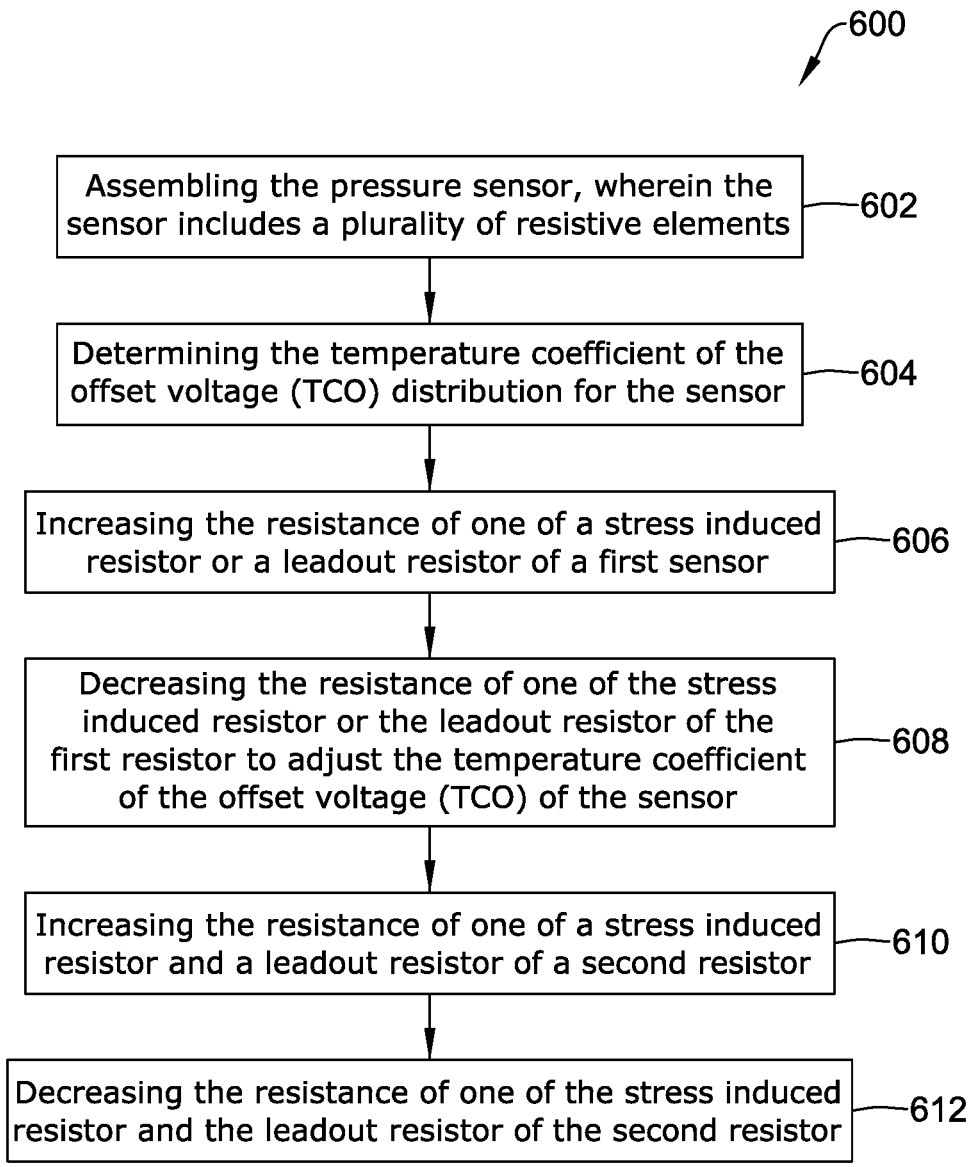
FIG. 6 is a flow diagram showing a method of adjusting a temperature coefficient of the offset voltage (TCO) for a pressure sensor.

FIG. 6 is a flow diagram illustrating a method 600 for adjusting a temperature coefficient of the offset voltage (TCO) for a pressure sensor. As indicated at block 602, the pressure sensor is assembled. The pressure sensor includes a plurality of resistive elements. As indicated at block 604, the temperature coefficient of the offset voltage (TCO) is determined for the sensor. As indicated at block 606, the resistance of one of a stress induced resistor or a leadout resistor of a first resistor is increased. As indicated at block 608, the resistance of one of the stress induced resistor or the leadout resistor of the first resistor is decreased to adjust the temperature coefficient of the offset voltage (TCO) of the sensor. As indicated at block 610, the resistance of one of a stress induced resistor and a leadout resistor of a second resistor may be increased. As indicated at block 612, the resistance of one of a stress induced resistor and a leadout resistor of a second resistor may be decreased.

Figure 7:
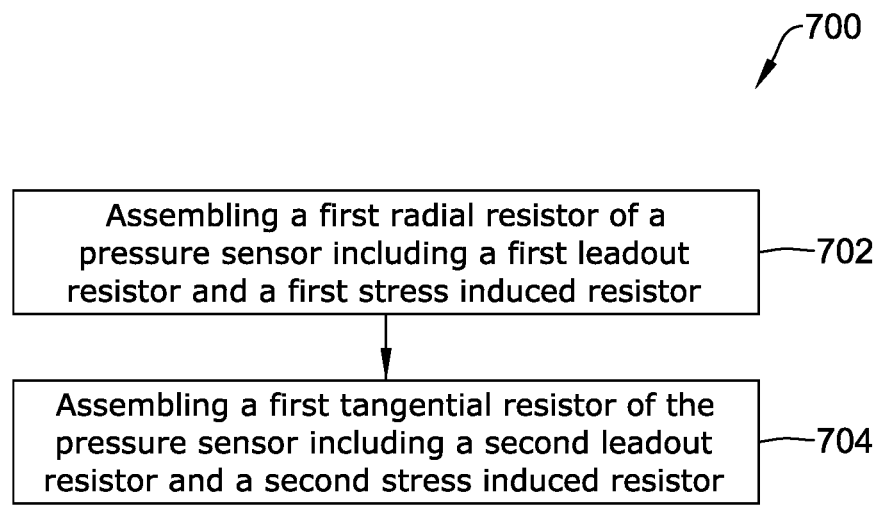
FIG. 7 is a flow diagram showing a method.

FIG. 7 is a flow diagram illustrating a method 700. As indicated at block 702, the method 700 includes assembling a first radial resistor of a pressure sensor including a first leadout resistor and a first stress induced resistor. As indicated at block 704, the method 700 includes assembly a first tangential resistor of the pressure sensor including a second leadout resistor and a second stress induced resistor. The first leadout resistor has a different resistor than the second leadout resistor. The pressure sensor has a temperature coefficient of the offset voltage (TCO) within a range of 0±4 microvolts per volt per degree Celsius ($\mu V/VPC$).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for adjusting a temperature coefficient of the offset voltage (TCO) for a pressure sensor, the method comprising:
   assembling the pressure sensor, wherein the sensor comprises a plurality of resistive elements;
   determining the temperature coefficient of the offset voltage (TCO) distribution for the sensor;
   increasing the resistance of one of a stress induced resistor or a leadout resistor of a first resistor and decreasing the resistance of the other of the stress induced resistor or the leadout resistor of the first resistor to adjust the temperature coefficient of the offset voltage (TCO) of the sensor.

2. The method of claim 1, wherein the value of the increase in resistance is substantially equal to the value of the decrease in resistance.

3. The method of claim 1, wherein the stress induced resistor of the first resistor is assembled tangential to a diaphragm of the sensor.

4. The method of claim 1, wherein the stress induced resistor of the first resistor is assembled radial to the diaphragm of the sensor.

5. The method of claim 1, further comprising increasing the resistance of one of a stress induced resistor and a leadout resistor of a second resistor and decreasing the resistance of the other of the stress induced resistor or the leadout resistor of the second resistor.

6. The method of claim 5, wherein the stress induced resistor of the first resistor is assembled radial to the diaphragm of the sensor, and wherein the stress induced resistor of the second resistor is assembled radial to the diaphragm of the sensor.

7. The method of claim 5, wherein the stress induced resistor of the first resistor is assembled tangential to the diaphragm of the sensor, and wherein the stress induced resistor of the second resistor is assembled tangential to the diaphragm of the sensor.

8. The method of claim 5, wherein the resistors are arranged to form a Wheatstone bridge.

9. A pressure sensor comprising:
   a plurality of resistive elements;
   at least one radial resistor comprising a first leadout resistor that changes with temperature, and a first stress induced resistor that changes with stress; and
   at least one tangential resistor comprising a second leadout resistor that changes with temperature, and a second stress induced resistor that changes with stress;
   wherein:
   the first leadout resistor comprises a different resistance than the second leadout resistor, and
   the sensor is configured to provide a temperature coefficient of the offset voltage (TCO) that is within a range of 0±4 microvolts per volt per degree Celsius ($\mu V/V/°C$.).

10. The pressure sensor of claim 9, wherein the first stress induced resistor comprises a different resistance than the second stress induced resistor.

11. The pressure sensor of claim 9, wherein the resistance of the first leadout resistor is increased and the resistance of the first stress induced resistor is decreased by substantially the same value.

12. The pressure sensor of claim 9, wherein the resistance of the first leadout resistor is decreased and the resistance of the first stress induced resistor is increased by substantially the same value.

13. The pressure sensor of claim 9, wherein the stress induced resistor comprises a piezoresistor.

14. The pressure sensor of claim 9, further comprising a second radial resistor, wherein the total resistance of the second radial resistor is substantially equal to the total resistance of a first radial resistor.

15. The pressure sensor of claim 9, further comprising a second tangential resistor, wherein the total resistance of the second tangential resistor is substantially equal to the total resistance of a first tangential resistor.

16. The pressure sensor of claim 9, wherein the sensor comprises a Wheatstone bridge arrangement.

17. A method comprising:
assembling a first radial resistor of a pressure sensor comprising a first leadout resistor and a first stress induced resistor; and
assembling a first tangential resistor of the pressure sensor comprising a second leadout resistor and a second stress induced resistor,
wherein:
the first leadout resistor comprises a different resistance than the second leadout resistor, and
the pressure sensor has a temperature coefficient of the offset voltage (TCO) within a range of 0±4 microvolts per volt per degree Celsius ($\mu V/V/°C$.).

18. The method of claim 17, wherein the first stress induced resistor comprises a different resistance than the second stress induced resistor.

* * * * *